United States Patent
Kim

(10) Patent No.: US 8,094,604 B2
(45) Date of Patent: Jan. 10, 2012

(54) METHOD OF INPUTTING DATA IN A WIRELESS TERMINAL AND WIRELESS TERMINAL IMPLEMENTING THE SAME

(75) Inventor: Yong-Youn Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 945 days.

(21) Appl. No.: 11/654,621

(22) Filed: Jan. 18, 2007

(65) Prior Publication Data

US 2008/0043700 A1   Feb. 21, 2008

(30) Foreign Application Priority Data

Aug. 21, 2006   (KR) .................. 10-2006-0079040

(51) Int. Cl.
*H04J 3/08*   (2006.01)
(52) U.S. Cl. ........ 370/315; 455/566; 455/575; 358/540; 382/181; 382/182
(58) Field of Classification Search .................. 370/315; 455/566, 575; 358/540; 382/181, 182
See application file for complete search history.

(56) References Cited

U.S. PATENT DOCUMENTS

| | | | |
|---|---|---|---|
| 2002/0058536 A1* | 5/2002 | Horii et al. ..................... | 455/566 |
| 2005/0208978 A1* | 9/2005 | Pylkko .......................... | 455/566 |

FOREIGN PATENT DOCUMENTS

| | | |
|---|---|---|
| KR | 1020060023476 A | 3/2006 |
| KR | 10-0689525 B1 | 2/2007 |

* cited by examiner

*Primary Examiner* — Dwayne Bost
*Assistant Examiner* — Amancio Gonzalez
(74) *Attorney, Agent, or Firm* — Roylance, Abrams, Berdo & Goodman, LLP

(57) ABSTRACT

A method of inputting data into a wireless terminal and wireless terminal implementing the same are provided, in which first data is input in data input mode, at least one pixel value of the first data detected is registered at a predetermined reference position, second data is input, at least one pixel value of the second data detected at the predetermined reference position is registered, the registered pixel value of the first data is compared with the registered pixel value of the second data, and the pixel value of the second data comprising the same value as the registered pixel value of the first data is tracked. Accordingly, an opposite direction of the data moving direction is determined as the moving direction of the wireless terminal.

13 Claims, 5 Drawing Sheets

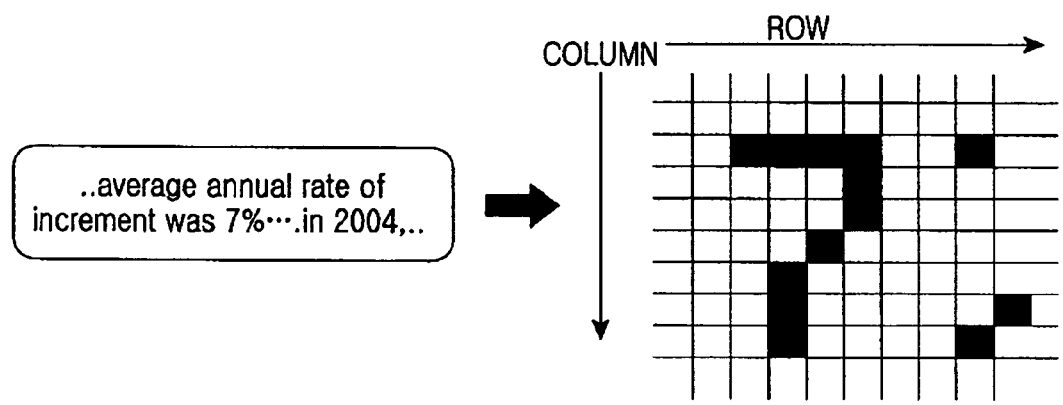
FIG.4A
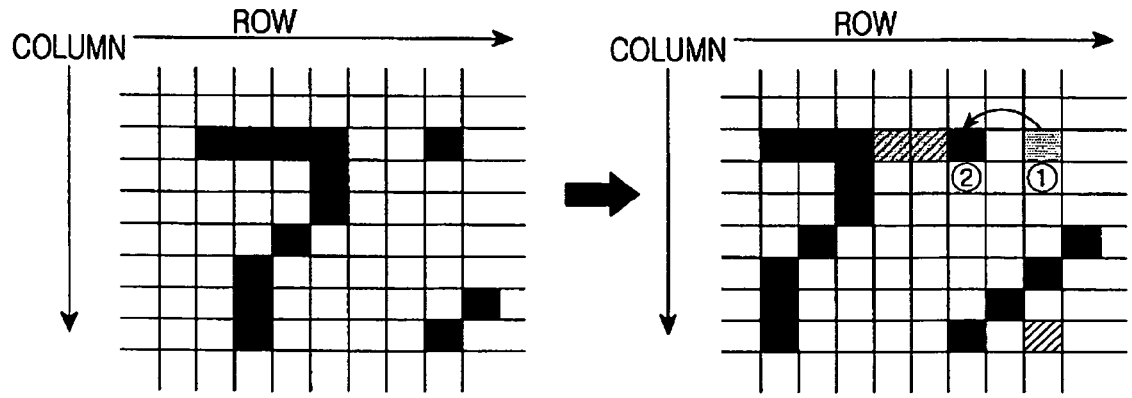
FIG.4B
FIG.4C-1    FIG.4C-2

METHOD OF INPUTTING DATA IN A WIRELESS TERMINAL AND WIRELESS TERMINAL IMPLEMENTING THE SAME

CROSS-REFERENCE TO RELATED APPLICATION

This application claims the benefit under 35 U.S.C. §119 (a) of a Korean Patent Application filed in the Korean Intellectual Property Office on Aug. 21, 2006 and assigned Serial No. 2006-79040, the entire disclosure of which is hereby incorporated by reference.

BACKGROUND OF THE INVENTION

1. Field of the Invention

The present invention relates to a wireless terminal. More particularly, the present invention relates to a technology for detecting a moving direction of a wireless terminal.

2. Description of the Related Art

A wireless terminal has been developed to perform various functions such as multimedia functions in addition to ordinary voice communication. The wireless terminal may also serve as a portable storage device for facilitating input and output of data. For inputting data into the wireless terminal, various keys of a keypad are manually operated, or voice recognition process is employed. However, the manual operation of the keys is complicated because a user should be very attentive to the order of the key arrangement while the voice recognition process is very susceptible to environmental errors.

Accordingly, there is a need for an improved method and wireless terminal for inputting data in the wireless terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of inputting data into a wireless terminal.

According to an aspect of exemplary embodiments of the present invention, a method of inputting data into a wireless terminal comprises inputting first data in data input mode, registering at least one pixel value of the first data detected at a predetermined reference position, inputting second data, registering at least one pixel value of the second data detected at the predetermined reference position, comparing the registered pixel value of the first data with the registered pixel value of the second data, and tracking the registered pixel of the second data having a same value as the registered pixel value of the first data, thereby determining an opposite direction of the data moving direction as the moving direction of the wireless terminal.

BRIEF DESCRIPTION OF THE DRAWINGS

The above and other objects, features and advantages of certain exemplary embodiments of the present invention will be more apparent from the following detailed description taken in conjunction with the accompanying drawing, in which:

FIG. 4 is a view for illustrating a relationship between the wireless terminal and a text scanned by the wireless terminal.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
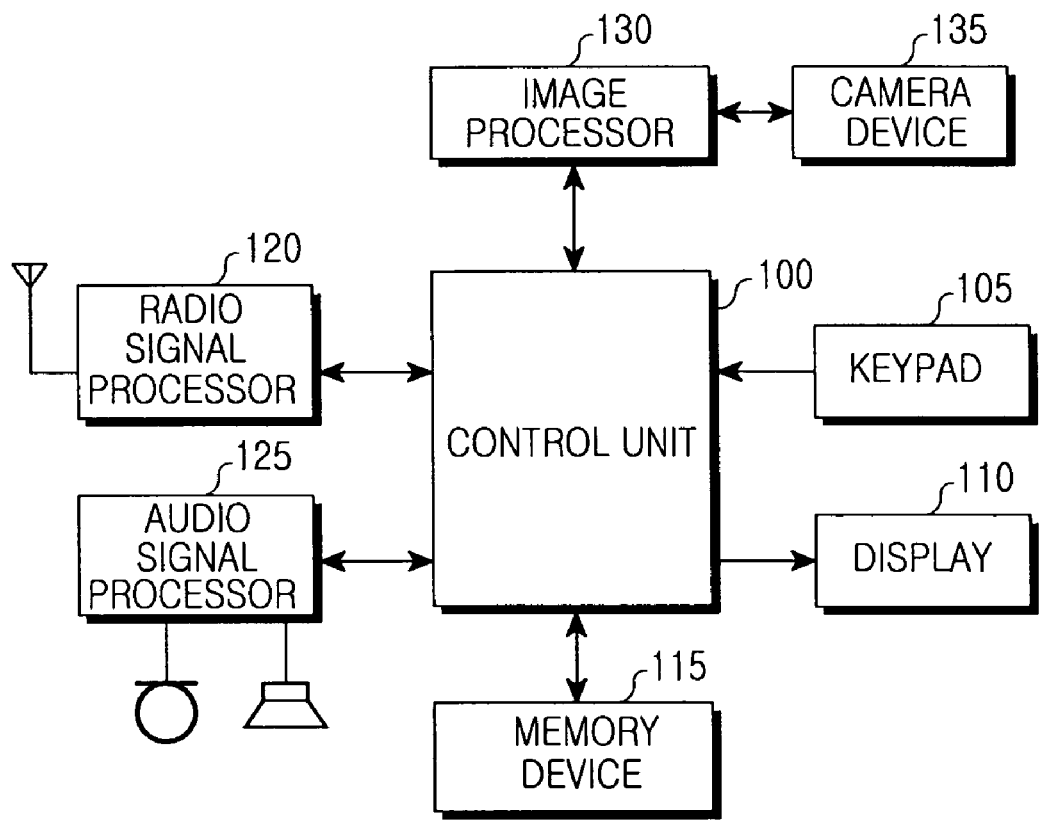
FIG. 1 is a block diagram for showing a structure of a wireless terminal to which an exemplary embodiment of the present invention is applied.

Referring to FIG. 1, the wireless terminal comprising a control unit 100 controls the entire functions of a wireless terminal. A user, for example, may command the control unit 100 to control a memory device 115 to store a predetermined reference position including at least one row and at least one column to compare pixel values of data inputted. For example, the control unit 100 registers the values of the pixels of the data inputted through a camera device 135 that are detected at the predetermined reference position, and compares the pixel values with each other when a predetermined time has passed or a predetermined amount of data has been inputted. Subsequently, the control unit tracks the position of the data having the same pixel value in the range of the predetermined reference position in order to determine the moved position of the wireless terminal. The control unit 100 controls a display 110 to display the moving path of the wireless terminal in character input mode according to an exemplary embodiment of the present invention. When the user commands the control unit 100 to translate the data contained in the moving path displayed in the display 110 into characters, the control unit 100 controls the display 110 to display the translated data in the same form as the characters entered through a keypad 105. The keypad 105 includes the data keys for entering various numbers and characters and the function keys for setting various functions. The keypad 105 is also used to enter a camera drive signal for driving a camera device 135, and a character translation signal for commanding the control unit to translate the data inputted by the camera device 135 along the moving path of the wireless terminal.

Additionally, the wireless terminal may serve as a mouse in connection with a computer by entering a signal selected by a key or from a menu by a cable connection or Bluetooth communication. Data inputted through the camera device 135 is analyzed to detect a moving direction of the wireless terminal. If a user enters a signal for employing the wireless terminal as a mouse, a cursor is generated moving along the moving path of the wireless terminal.

The display 110 also displays present operational states of the control unit 100 according to the signals entered through the keypad 105, the image data produced by an image processor 130, and a user interface for performing a photographing function. The display 110 may be a liquid crystal display (LCD), which consists of an LCD controller, a memory device for storing image data, and LCD elements. If the LCD is designed to function as a touch screen, it may serve as an input device along with the keypad 105. The display 110 displays sequentially the data entered through the camera device 135. The display 110 may be controlled by the control unit 100 to display both the moving path of the wireless terminal and characters obtained by translating the data detected along the moving path according to the character translation signal. The display 110 may also display a traversed path of said wireless terminal along the moving path. The control unit 100 translates data of the traversed path into characters, if a command is entered by a key of the key pad 105 or selection from a menu from the display 110 of the wireless terminal. Once the wireless terminal serves as a mouse connected to a computer, the mouse cursor moves along the traversed path. The display 110 is then divided to display the traversed path and data translated into characters.

The memory device 115 stores both programs executed by the control unit 100 and data processed by the programs. The memory device 115 may also store various bell sounds, MP3, moving pictures, phone books, messages, and the like, that are outputted from the wireless terminal. The memory device 115 includes a read-only memory (ROM) for storing the operating programs, an electrically erasable and programmable read only memory (EEPROM), and a random access memory (RAM). According to an exemplary embodiment of the present invention, the memory device 115 stores the predetermined reference position including at least one row and at least one column among regions displayed in the display 110. Thus, the memory device 115 stores the value of the pixel of the data inputted through the camera device 135 that is detected at the predetermined reference position.

A radio signal processor 120 enables the wireless terminal to perform wireless communication, including a radio frequency (RF) transmitter for modulating and amplifying the signals transmitted, and an RF receiver for demodulating and low-noise amplifying the signals received. According to an exemplary embodiment of the present invention, the radio signal processor also serves to transmit the characters obtained by translating the data detected along the moving path of the wireless terminal as a character message to another wireless terminal.

An audio signal processor 125 may include a codec device, which includes a data codec for processing data packets and an audio codec for processing audio signals like voice. The audio signal processor 125 causes the audio codec to convert digital audio signals into analog audio signals, or the analog audio signals inputted through a microphone into the digital audio signals.

Figure 2:
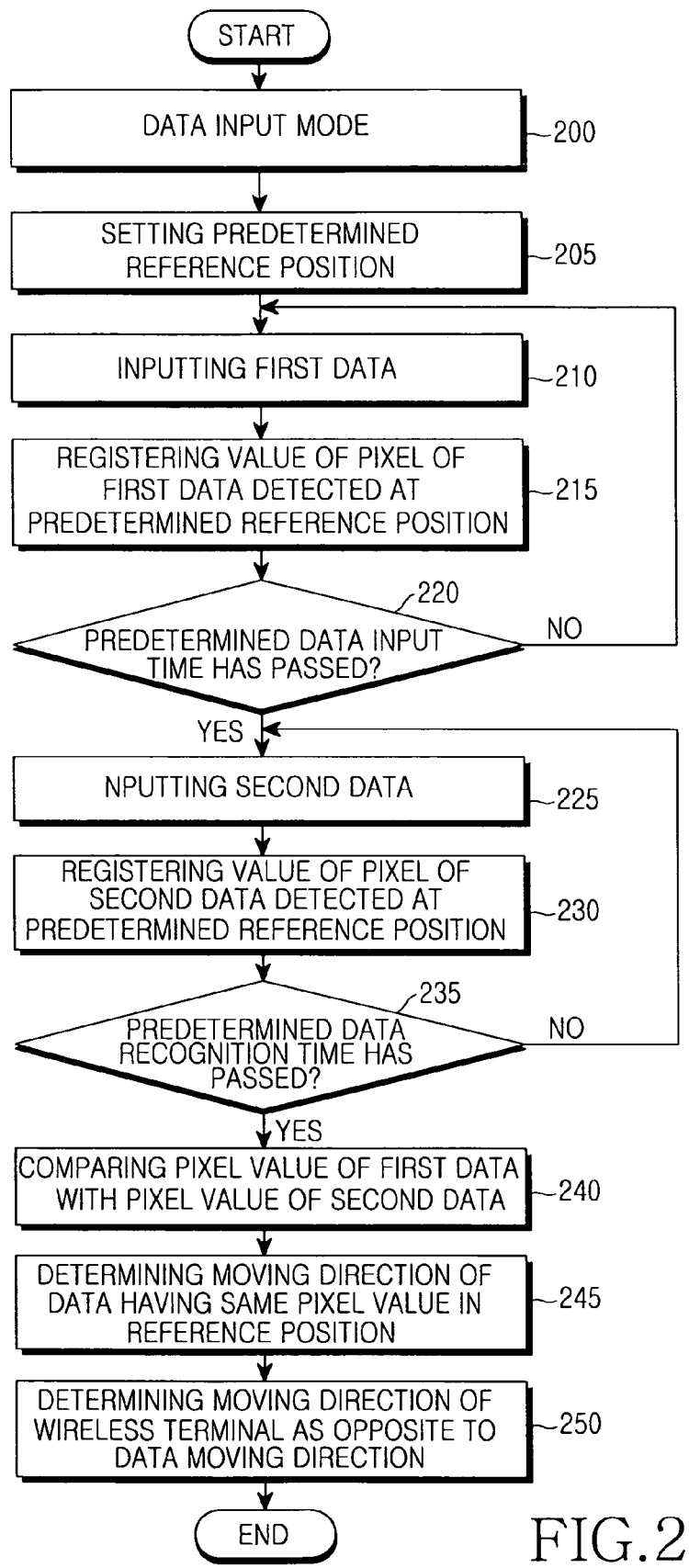
FIG. 2 is a flowchart for showing a process of detecting a moving direction of the wireless terminal according to an exemplary embodiment of the present invention.

Referring to FIGS. 2 and 4, the control unit 100 operates at data input mode in step 200. The data input mode enables the camera device 135 to scan data. Receiving a signal for starting the data input mode, the control unit 100 proceeds to step 205 to set the predetermined reference position to compare the pixel values of the data inputted. The predetermined reference position includes at least one row and at least one column. It may be set by a user's request. Then the control unit 100 proceeds to step 210 to receive first data through the camera device 135. Subsequently, the control unit 100 proceeds to step 215 to register the value of the pixel of the first data detected at the predetermined reference position set in the step 205.

After storing the pixel value of the first data corresponding to the predetermined reference value, the control unit 100 executes step 220 to determine if a predetermined data input frequency has passed. If the predetermined data input frequency has passed, the control unit 100 executes step 225 to receive second data through the camera device 135 along with the first data. The predetermined data input frequency may be set by the user. Preferably, the predetermined data input frequency is short in order to reduce errors in detecting the movement of the wireless terminal.

Subsequently, the control unit proceeds to step 230 to register the value of the pixel of the second data detected at the predetermined reference position. Then the control unit executes step 235 to determine if a predetermined data recognition time has passed for comparing the pixel values of the data registered in the memory device 115. If the predetermined data recognition time has not passed, the control unit returns to step 225 to receive the second data. On the contrary, if the predetermined data recognition time has passed, the control unit 100 proceeds to step 240 to compare the pixel value of the first data with the pixel value of the second data. Based on the comparison result, the control unit 100 determines in step 245 the moving direction of the data having the same pixel value in the reference position.

For example, FIG. 4A shows the wireless terminal placed on a position of a text having character data in the data input mode. In this case, the control unit 100 may cause the display 110 to display the image data inputted through the camera device 135. The control unit 100, as shown in FIG. 4B, sets the predetermined reference position including at least one row and at least one column, and detects the value of the pixel of the data corresponding to the reference position. FIGS. 4C-1 and 4C-2 respectively represent the first and second data inputted. The control unit 100, as shown in FIG. 4C-1, registers the value of the pixel of the first data corresponding to the reference position in the memory device 115, and compares in the step 240 the pixel value of the first data with that of the second data registered. Thereafter, the control unit 100 tracks the pixel of the second data having the same value as the registered pixel of the first data. When, comparing the pixel values as shown in FIG. 4C-2, it is discovered that the pixel of the second data represented by ② has the same value as the pixel of the first data represented by ①, which means that the pixel represented by ① has moved to the position of the pixel represented by ②. The moving direction of the pixel data discovered in step 245 enables the control unit 100 to determine the moving direction of the wireless terminal in step 250. Accordingly, the wireless terminal moves in the direction opposite to that of the data. The user may set the wireless terminal to display in the display 110 a message notifying its moving direction.

As described above, the method of determining the moving direction of the wireless terminal according to an exemplary embodiment of the present invention causes the control unit 100 to register the values of the pixels of the data detected at a predetermined reference position at every predetermined time interval, and causes the control unit to compare the registered pixel values corresponding to the reference position at every predetermined time interval to track the data having the same pixel value in the reference position, thereby determining the opposite data moving direction as the moving direction of the wireless terminal.

Figure 3:
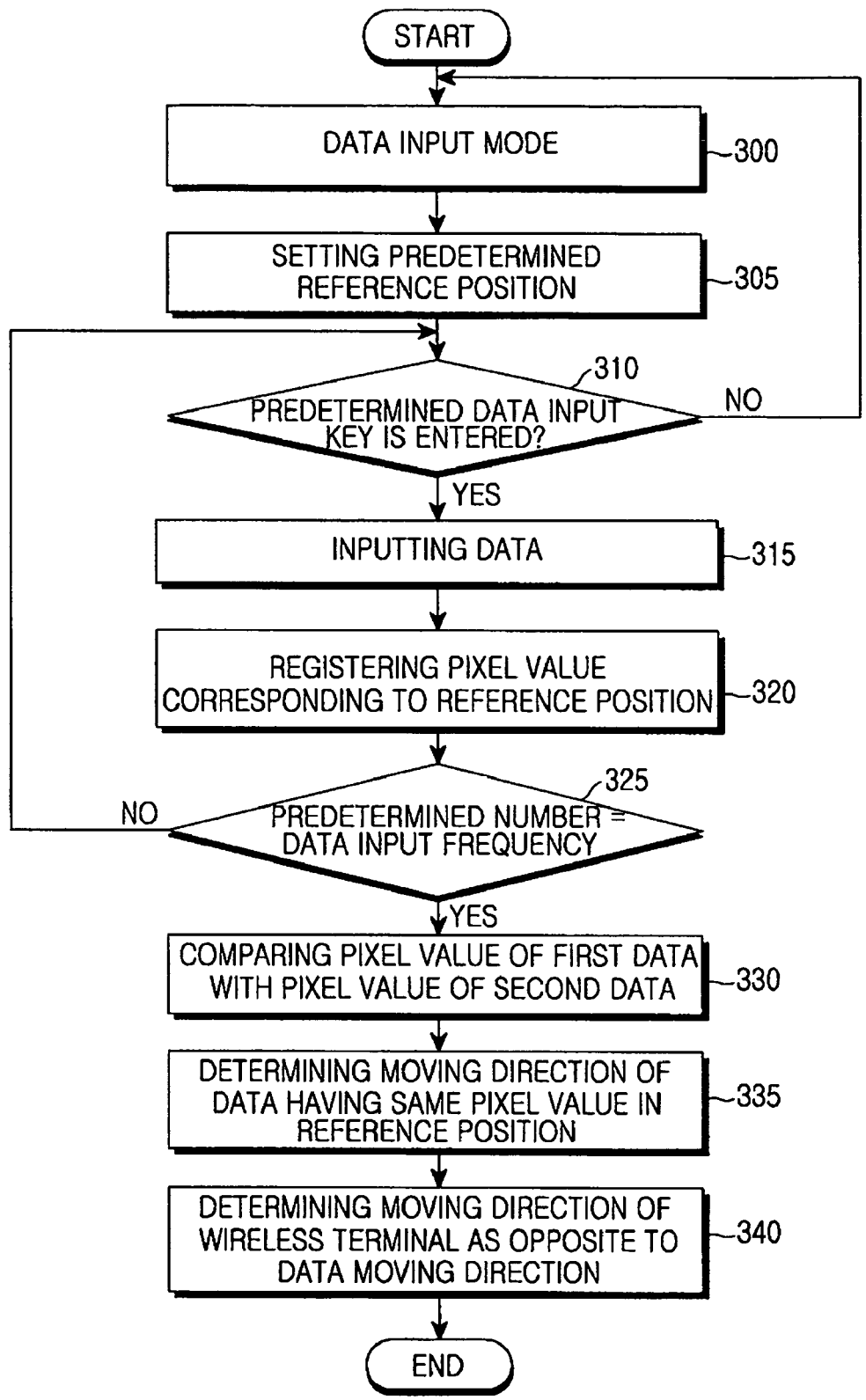
FIG. 3 is a flowchart for showing the process of detecting the moving direction of the wireless terminal according to an exemplary embodiment of the present invention.

FIG. 3 is a flowchart for showing the process of determining the moving direction of the wireless terminal according to an exemplary embodiment of the present invention. The control unit 100 operates in the data input mode in step 300, and sets the predetermined reference position in step 305, just as represented by steps 200 to 205 in FIG. 2. Then the control unit 100 executes step 310 to detect the input of a predetermined data input key. If the input of the data input key is detected, the control unit 100 proceeds to step 315 to receive the data entered through the camera device 135, as in step 225 of FIG. 2. Subsequently, the control unit 100 proceeds to step 320 to store the data entered and the pixel value corresponding to the reference position into the memory device 115.

Then the control unit 100 executes step 325 to determine if the data including the pixel value corresponding to the reference position is stored in the memory device 115 a predetermined number of times. For example, the control unit 100 determines in step 325 if the data input key for commanding the data input is entered a predetermined number of times. If the data has been entered the predetermined number of times, the control unit 100 executes steps 330 to 340 to track the pixels of the data inputted having the same value in the reference position to determine the moving direction of the wireless terminal, as in steps 240 to 250 of FIG. 2.

As described above, the method of determining the moving direction of the wireless terminal in an exemplary embodiment of the present invention causes the control unit 100 to store the data inputted through the camera device 135 and the pixel value corresponding to the predetermined reference position in the memory device 115 when the predetermined data input key is entered in the data input mode. Then, if the data input has been performed by the predetermined number of times, the control unit 100 compares the pixel values of the data inputted with each other to discover the moving direction of the data having the same pixel value, thereby determining the opposite data moving direction as the moving direction of the wireless terminal.

Figure 5:
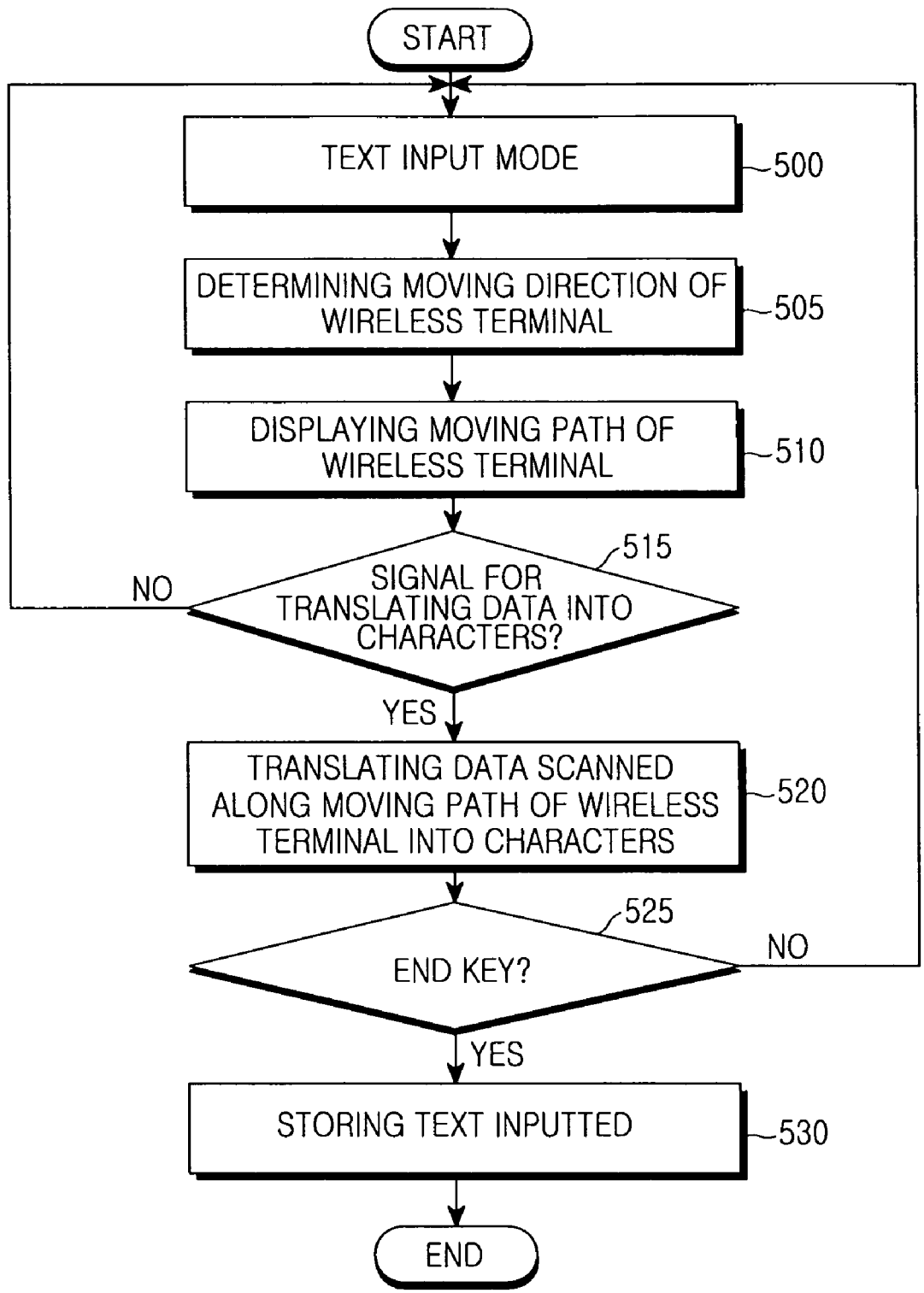
FIG. 5 is a flowchart for describing the process of operating a character input of the wireless terminal according to an exemplary embodiment of the present invention.

FIG. 5 is a flowchart for showing a process of inputting characters according to an exemplary embodiment of the present invention. The control unit 100 executes step 500 to set the wireless terminal in text input mode upon the user's request. The text input mode allows input of characters such as a message or memo through the keypad 105. The control unit 100 then determines the moving direction of the wireless terminal through sequential steps illustrated in FIGS. 2 and 3 in the text input mode in step 505 and displays the moving path of the wireless terminal in the display 110 in step 510. Thereafter, if a character translation signal is received for translating the data scanned along the moving path of the wireless terminal in step 515, the control unit 100 translates the data into characters displayed in a given region of the display 110 in step 520. For example, if a character translation signal is received, the control unit divides the screen of the display 110 to display both the data scanned along the moving path and the characters obtained by translating the data in their respective regions. Finally, when an end key is detected for terminating the operation of translating the data scanned along the moving path of the wireless terminal in step 525, the control unit 100 proceeds to step 530 to store the inputted text displayed in the display 110 into the memory device 115.

As described above, the exemplary embodiments of the present invention determines the moving path of the wireless terminal, displays the moving path in the display, and translates the data scanned along the moving path into characters upon a user's request. The characters inputted may be changed to have a given size and shape according to the user's setting. The exemplary embodiments of the present invention also enable the wireless terminal to serve as a mouse in connection with a computer.

While the invention has been shown and described with reference to a certain exemplary embodiments thereof, it will be understood by those skilled in the art that various changes in form and details may be made therein without departing from the spirit and scope of the invention.

What is claimed is:

1. A method of inputting data into a wireless terminal, the method comprising:
   inputting first data in data input mode via a camera device;
   registering at least one pixel value of the first data detected at a reference position;
   inputting second data via the camera device;
   registering at least one pixel value of the second data detected at the reference position;
   comparing the registered pixel value of the first data with the registered pixel value of the second data;
   tracking the registered pixel value of the second data comprising a same value as the registered pixel value of the first data to determine an opposite direction of the data moving direction as the moving direction of the wireless terminal;
   displaying the moving direction on a display screen; and
   translating image data in the first data and the second data into text, thus translating the moving direction into characters if a command is entered by at least one of a key of a keypad and a selection from a menu.

2. The method claimed in claim 1, wherein the data input mode is implemented by at least one of entering a key of a keypad for commanding a camera device mode and selecting a camera device mode from a menu.

3. The method claimed in claim 1, wherein the data is inputted through a camera device at a reference time interval.

4. The method claimed in claim 1, wherein the data is inputted through a camera device when at least one of a reference time has passed and a predetermined amount of data is inputted.

5. The method claimed in claim 1, wherein the comparing of the registered pixel value of said first data with the registered pixel value of said second data is implemented when at least one of a reference time has passed and the data has been inputted a predetermined number of times.

6. The method claimed in claim 1, wherein the reference position comprises a display region including at least one row and one column.

7. The method claimed in claim 1, wherein the display screen displays at least one of the moving direction and the characters translated from the moving direction.

8. The method claimed in claim 1, further comprising, if a command is entered to convert the wireless terminal to a mouse connected to a computer, generating a cursor to move along the moving direction.

9. A wireless terminal comprising:
   a control unit for receiving first data in data input mode, registering at least one pixel value of the first data detected at a reference position, receiving second data, registering at least one pixel value of the second data detected at the reference position, comparing the registered pixel value of the first data with the registered pixel value of the second data and translating image data in the first data and the second data into text;
   a keypad comprising data keys for entering a camera drive signal for driving a camera device and a character translation signal for commanding the control unit to translate data input by the camera device along a moving direction of the wireless terminal; and
   a display comprising a display screen for displaying a menu and the moving direction of the wireless terminal and characters obtained by translating data detected along the moving direction according to the character translation signal.

10. The wireless terminal of claim 9, wherein the data input mode is implemented by at least one of entering a key of the keypad for commanding a camera device mode and selecting the camera device mode from the menu.

11. The wireless terminal of claim 9, wherein the control unit tracks the registered pixel value of the second data comprising a same value as the registered pixel value of the first data to determine an opposite direction of the data moving direction as the moving direction of the wireless terminal.

12. The wireless terminal of claim 9, wherein the reference position comprises a display region including at least one row and one column.

13. The wireless terminal of claim 9, where in the display further comprises displaying at least one of the moving direction and the characters translated from the moving direction.

\* \* \* \* \*